United States Patent
Hashimoto et al.

(10) Patent No.: US 11,056,992 B2
(45) Date of Patent: *Jul. 6, 2021

(54) MOTOR CONTROLLER

(71) Applicant: FANUC CORPORATION, Yamanashi (JP)

(72) Inventors: Shoutarou Hashimoto, Yamanashi (JP); Yuuki Morita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/434,704

(22) Filed: Jun. 7, 2019

(65) Prior Publication Data
US 2020/0007060 A1 Jan. 2, 2020

(30) Foreign Application Priority Data
Jun. 28, 2018 (JP) .............................. JP2018-122880

(51) Int. Cl.
*H02P 21/18* (2016.01)
*H02P 21/24* (2016.01)

(52) U.S. Cl.
CPC .............. *H02P 21/18* (2016.02); *H02P 21/24* (2016.02)

(58) Field of Classification Search
CPC ........... H02P 21/18; H02P 21/24; H02P 21/28
(Continued)

(56) References Cited

U.S. PATENT DOCUMENTS 5,256,944 A * 10/1993 Tobise ................. H02P 7/2855
318/799
5,471,126 A 11/1995 Kona et al.
(Continued)

FOREIGN PATENT DOCUMENTS

CN 1274987 A 11/2000
CN 1974181 A 6/2007
(Continued)

OTHER PUBLICATIONS

Office Action issued in JP 2018-122880; mailed by the Japanese Patent Office dated Jun. 2, 2020.
(Continued)

*Primary Examiner* — Kawing Chan
*Assistant Examiner* — Zemenay T Truneh
(74) *Attorney, Agent, or Firm* — Studebaker & Brackett PC

(57) ABSTRACT

A motor controller includes: a rotation speed estimating unit that estimates a rotation speed of a motor based on current information and primary frequency information of the motor; a proximity switch that outputs an ON signal when a portion of a rotating body of the motor is in proximity and that outputs an OFF signal when a portion of the rotating body of the motor is not in proximity; a rotation speed calculating unit that calculates a rotation speed of the motor based on the ON signal and the OFF signal output from the proximity switch; a speed command compensating unit that compensates a speed command value such that an error between the speed command value and a rotation speed calculation value becomes smaller; and a speed control system that perform the speed control on the motor based on the compensated speed command value and the rotation speed estimation value.

6 Claims, 6 Drawing Sheets

(58) Field of Classification Search
USPC .......................................................... 318/806
See application file for complete search history.

(56) References Cited

U.S. PATENT DOCUMENTS

| | | | | |
|---|---|---|---|---|
| 2003/0052643 | A1* | 3/2003 | Sweo | ...................... H02P 21/34 |
| | | | | 318/801 |
| 2005/0062448 | A1* | 3/2005 | Oh | ........................ H02P 23/186 |
| | | | | 318/268 |
| 2008/0272730 | A1* | 11/2008 | Hoda | ........................ H02P 8/14 |
| | | | | 318/685 |
| 2016/0218657 | A1 | 7/2016 | Nondahl et al. | |

FOREIGN PATENT DOCUMENTS

| | | | |
|---|---|---|---|
| CN | 103427745 A | 12/2013 | |
| CN | 107509394 A | 12/2017 | |
| CN | 107615641 A | 1/2018 | |
| DE | 39 00 464 A1 | 7/1990 | |
| DE | 10 2006 045 397 A1 | 4/2008 | |
| JP | H02-278174 A | 11/1990 | |
| JP | H04-096681 A | 3/1992 | |
| JP | H05-68391 A | 3/1993 | |
| JP | H06-233579 A | 8/1994 | |
| JP | H10-033000 * | 2/1998 | .............. H02P 21/00 |
| JP | H10-033000 A | 2/1998 | |
| JP | H10-225196 A | 8/1998 | |
| JP | H11-069860 * | 3/1999 | ................ H02P 5/41 |
| JP | H11-069860 A | 3/1999 | |
| JP | 2006-158026 A | 6/2006 | |
| JP | 2011-211768 A | 10/2011 | |
| JP | 2013-240194 A | 11/2013 | |
| JP | 5435252 B2 | 3/2014 | |
| WO | 2015/136696 A1 | 9/2015 | |

OTHER PUBLICATIONS

An Office Action issued by the China National Intellectual Property Administration dated Oct. 12, 2020, which corresponds to Chinese Patent Application No. 201910556732.1 and is related to U.S. Appl. No. 16/434,704 with English language translation.

Gabriel Gallegos-Lopez et al., "Current Control of Induction Machines in the Field-Weakened Region" in Transactions on Industry Applications, Jul./Aug. 2007, vol. 43, Issue: 4, IEEE, pp. 981-989.

Norm Din En 60947-5-2, VDE 0660-208, Niederspannungsschaltgerate—Teil 5-2: Steuergerate und Schaltelemente-Naherungsschalter (IEC 60947-5-2:2007 + A1:2012); Deutsche Fassung EN 60947-5-2:2007 + A1:2012.S.1-110, Jan. 2014, total 107 pages.

An Office Action mailed by China National Intellectual Property Administration dated Oct. 9, 2019, which corresponds to Chinese Patent Application No. 201810818379.5 and is related to U.S. Appl. No. 16/434,704; with English language translation.

An Office Action; "Notice of Reasons for Refusal", mailed by the Japanese Patent Office dated May 7, 2019, which corresponds to Japanese Patent Application No. 2017-146987 and is related to U.S. Appl. No. 16/434,704; with English language translation.

An Office Action issued by the United States Patent and Trademark Office dated Jun. 19, 2019, which corresponds to U.S. Appl. No. 16/019,930 and is related to U.S. Appl. No. 16/434,704.

An Office Action mailed by the German Patent Office dated Aug. 17, 2020, which corresponds to German Patent Application No. 10 2018 211 149.9 and is related to U.S. Appl. No. 16/434,704; with English language translation.

* cited by examiner

MOTOR CONTROLLER

This application is based on and claims the benefit of priority from Japanese Patent Application No. 2018-122880, filed on 28 Jun. 2018, the content of which is incorporated herein by reference.

BACKGROUND OF THE INVENTION

Field of the Invention

The present invention relates to a motor controller that performs speed sensorless control on a motor.

Related Art

A motor controller that drives and controls a motor such as an induction motor or a synchronous motor is classified into a motor controller that uses a speed sensor such as a rotary encoder or a resolver and a motor controller that performs so-called speed sensorless control without use of such a speed sensor. Patent Documents 1 and 2 disclose a motor controller that performs speed sensorless control on a motor.

For example, the motor controller disclosed in Patent Document 2 estimates a primary frequency and a slip frequency of a motor from an actual current value (a current FB value) of the motor, estimates a rotation speed of the motor by subtracting the slip frequency estimation value from a primary frequency estimation value and drives and controls the motor on the basis of this rotation speed estimation value. Since such a motor controller does not include a speed sensor, the motor controller has advantages in a low cost, a small size and the like. Moreover, since wiring for the speed sensor is not necessary, it is possible to enhance the water-repellent performance of the motor.

Patent Document 1: Japanese Patent No. 5435252
Patent Document 2: Japanese Unexamined Patent Application, Publication No. 2013-240194

SUMMARY OF THE INVENTION

However, an actual speed may deviate greatly from the rotation speed estimation value. This is particularly likely to occur in a heavy load state, during rotation in a low speed range, during rapid change in load (during rapid transient change) or during rapid change in speed (during rapid transient change, for example, during acceleration and deceleration).

A motor controller that performs speed sensorless control performs control such that a rotation speed estimation value follows a speed command value. However, when an actual speed deviates from the rotation speed estimation value (in particular, in a heavy load state, during rotation in a low speed range, during rapid change in load or during rapid change in speed), though the rotation speed estimation value follows the speed command value, the actual speed deviates greatly from the speed command value. Hence, the deviation between the actual speed and the speed command value occurs.

An object of the present invention is to provide a motor controller that performs speed sensorless control on a motor and that enhances the degree to which an actual speed follows a speed command value.

(1) A motor controller (for example, a motor controller 1 to be described later) according to the present invention is a motor controller that performs speed sensorless control on a motor (for example, an induction motor 3 to be described later) and includes: a rotation speed estimating unit (for example, a rotation speed estimating unit 30 to be described later) that estimates a rotation speed of the motor on the basis of current, information and primary frequency information of the motor; a speed control system (for example, a speed control system 10 to be described later) that performs speed control on the motor on the basis of a rotation speed estimation value estimated by the rotation speed estimating unit; a proximity switch (for example, a proximity switch 31 to be described later) that outputs an ON signal when a portion of a rotating body of the motor is in proximity and outputs an OFF signal when a portion of the rotating body of the motor is not in proximity; a rotation speed calculating unit (for example, a rotation speed calculating unit 32 to be described later) that calculates a rotation speed of the motor on the basis of the ON signal and the OFF signal output from the proximity switch; and a speed command compensating unit (for example, a speed command compensating unit 34 to be described later) that compensates a speed command value such that an error between the speed command value and a rotation speed calculation value calculated by the rotation speed calculating unit becomes smaller, and the speed control system performs the speed control on the motor on the basis of the speed command value that is compensated by the speed command compensating unit and the rotation speed estimation value.

(2) In the motor controller described in (1), the speed command compensating unit may include: a subtractor (for example, a subtractor 341 to be described later) that obtains the error between the speed command value and the rotation speed calculation value calculated by the rotation speed calculating unit; a computing unit (for example, a computing unit 342 to be described later) that computes a compensation value for the speed command value on the basis of the error obtained by the subtractor; and an adder (for example, an adder 343 to be described later) that adds the compensation value computed by the computing unit to the speed command value so as to obtain the speed command value that is compensated.

(3) In the motor controller described in (2), the computing unit may be formed with an integral term.

According to the present invention, it is possible to provide a motor controller that performs speed sensorless control on a motor and that enhances the degree to which an actual speed follows a speed command value.

DETAILED DESCRIPTION OF THE INVENTION

Figure 1:
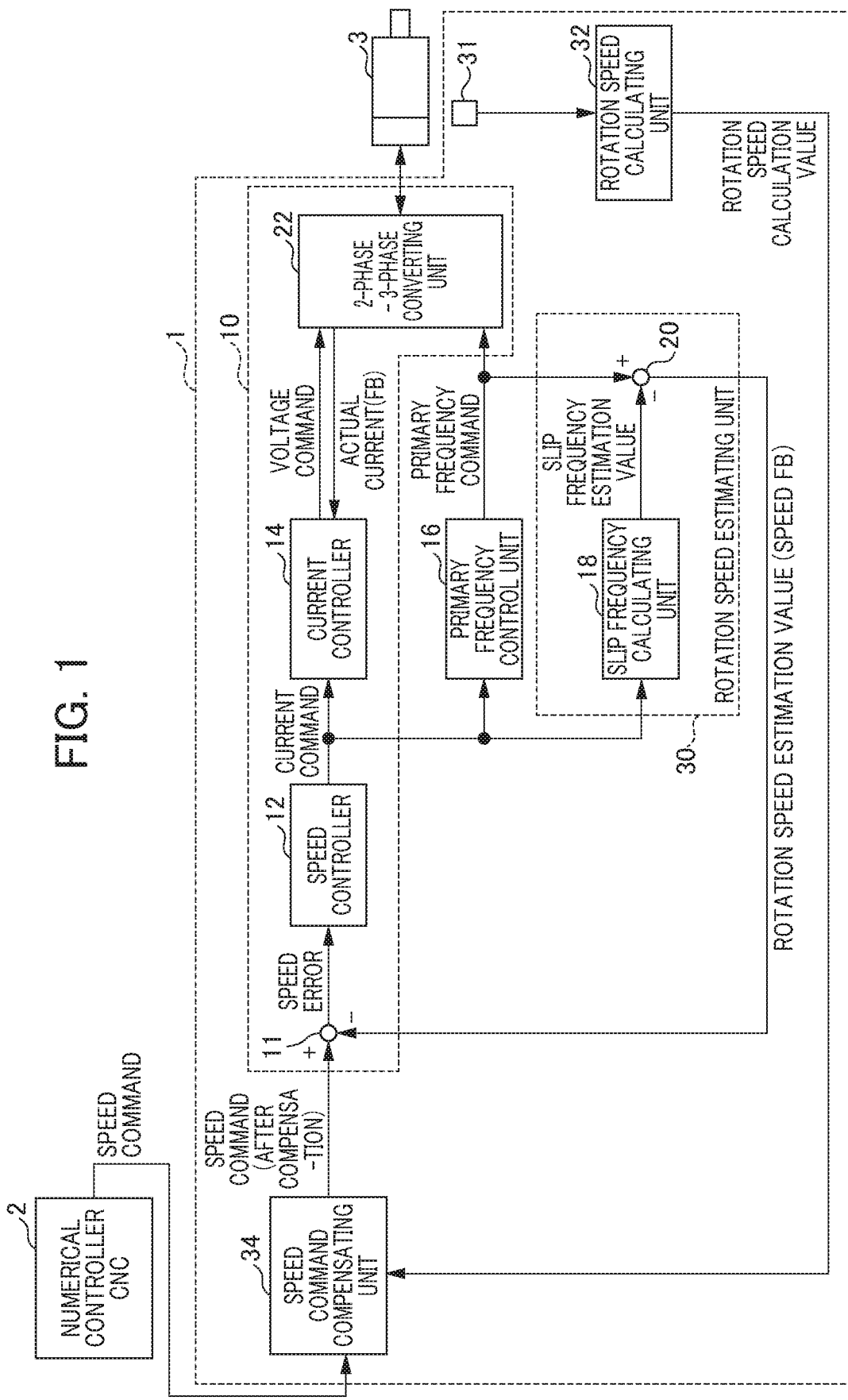
FIG. 1 is a diagram showing a configuration of a motor controller according to the present embodiment.

An example of an embodiment of the present invention will be described below with reference to accompanying drawings. In the drawings, the same or corresponding portions are identified with the same reference numerals.

FIG. 1 is a diagram showing a configuration of a motor controller according to the present embodiment. The motor controller 1 shown in FIG. 1 drives and controls an induction motor 3 according to a speed command that is supplied from a numerical controller (CNC) 2 and that is based on a machining program.

The induction motor 3 drives, for example, the spindle (rotary axis) of a machine tool that performs machining. The induction motor 3 is a so-called speed sensorless motor that does not include a speed sensor such as a rotary encoder.

The motor controller 1 is a motor controller which performs so-called speed sensorless control which does not use a speed sensor such as a rotary encoder. The motor controller 1 performs vector control on the induction motor 3.

The motor controller 1 includes a subtractor 11, a speed controller 12, a current controller 14, a primary frequency control unit 16, a slip frequency calculating unit 18, subtractor 20 and a 2-phase-3-phase converting unit 22. The subtractor 11, the speed controller 12, the current controller 14 and the 2-phase-3-phase converting unit 22 form a speed control system 10. Moreover, the slip frequency calculating unit 18 and the subtractor 20 form a rotation speed estimating unit 30. The motor controller 1 further includes a proximity switch 31, a rotation speed calculating unit 32 and a speed command compensating unit 34.

The subtractor 11 obtains a speed error between a speed command value (after compensation) obtained by compensating, by the speed command compensating unit 34 to be described later, a speed command value supplied from the numerical controller 2 and a rotation speed estimation value (a speed FP)) estimated by the rotation speed estimating unit 30 to be described later. The speed controller 12 performs, for example, PI (proportional, integral) control on the speed error obtained by the subtractor 11 so as to generate a current command value (a torque command value).

The current controller 14 generates a voltage command value on the basis of the current command value (a torque command value) generated by the speed controller 12 and an actual current value (a drive current value, a current FB value) of the induction motor 3 detected by a current detector (not shown). The current controller 14 performs vector control, for example. Specifically, the current controller 14 generates a d-phase current command value (an excitation current command value) and a q-phase current command value (a torque current command value) from the current command value (the torque command value). The current controller 14 generates a d-phase voltage command value on the basis of a difference between the d-phase current command value and a d-phase actual current value obtained by the 2-phase-3-phase converting unit 22 converting an actual current value of the three UVW phases. Moreover, the current controller 14 generates a q-phase voltage command value on the basis of a difference between the q-phase current command value and a q-phase actual current value obtained by the 2-phase-3-phase converting unit 22 converting an actual current value of the three UVW phases.

The primary frequency control unit 16 generates a primary frequency command value on the basis of the current command value (the torque command value) generated by the speed controller 12. As a method of calculating the primary frequency command value, various methods are known. For example, instead of the current command value, the actual current value (for example, the q-phase actual current value) may be used or a current error between the current command value (for example, the q-phase current command value) and the actual current value (for example, the q-pnase actual current value) may be used.

The slip frequency calculating unit 18 calculates a slip frequency estimation value on the basis of the current command value (the torque command value) generated by the speed controller 12. Specifically, the slip frequency calculating unit 18 calculates, on the basis of the d-phase current command value and the q-phase current command value, an optimum slip frequency in slip-frequency-control-type vector control, to obtain a present slip frequency estimation value.

For example, a slip frequency estimation value $\omega_s$ [rad/s] is obtained by the following formula on the basis of a mutual inductance M, a secondary inductance $L_2$, a secondary resistance $R_2$, a secondary d-phase magnetic flux value $\phi_{2d}$ and a primary q-phase current value $i_{1q}$ of the induction motor 3.

$$\omega_s = \frac{MR_2}{L_2} \frac{i_{1q}}{\phi_{2d}}$$

Here, in a steady state, the secondary d-phase magnetic flux value $\phi_{2d}$ is obtained by the following formula on the basis of the mutual inductance M and a primary d-phase current value $i_{1d}$.

$$\phi_{2d} = Mi_{1d}$$

From this, the slip frequency estimation value $\omega_s$ in the steady state is obtained by formula (1) below.

$$\omega_s = \frac{R_2}{L_2} \frac{i_{1q}}{i_{1d}} = K \frac{i_{1d}}{i_{1d}} \tag{1}$$

In general, K is referred to as a slip constant.

As a method of calculating the slip frequency estimation value, various methods are known. For example, instead of the current command value, the actual current value, for example, the q-phase actual current value (PB) and the d-phase actual current value (PB) may be used.

The subtractor 20 obtains the rotation speed estimation value of the induction motor 3 by formula (2) below on the basis of the primary frequency command value obtained by the primary frequency control unit 16 and the slip frequency estimation value obtained by the slip frequency calculating unit 18.

(Rotation speed estimation value)=(Primary frequency command value)−(Slip frequency estimation value) (2)

In the present embodiment, the slip frequency calculating unit 18 and the subtractor 20 described above function as the rotation speed estimating unit 30. Specifically, the rotation speed estimating unit 30 estimates the slip frequency on the basis of the current command value (current information) generated by the speed controller 12 and the slip constant (in other words, a motor constant), and estimates the rotation speed of the induction motor 3 on the basis of the slip frequency estimation value and the primary frequency command value generated by the primary frequency control unit 16.

As described previously, the rotation speed estimating unit 30 may use the actual current value (current information) instead of the current command value.

The 2-phase-3-phase converting unit 22 converts, on the basis of the primary frequency command value from the primary frequency control unit 16, the d-phase voltage command value and the q-phase voltage command value generated by the current controller 14 into a voltage command value of the individual UVW phases, and thereby generates a voltage command value for driving the induction motor 3.

The proximity switch 31 is provided in the induction motor 3. The proximity switch 31 may be incorporated in the induction motor 3 or may be installed outside the induction motor 3. The proximity switch 31 is a proximity switch defined by JIS C 8201-5-2 or IEC60947-5-2, for example, and is an inductive proximity switch, a capacitive proximity switch or the like that detects proximity of a metallic and/or nonmetallic object. The proximity switch 31 outputs an ON signal when a portion of a shaft (a rotating body) of the induction motor 3 is in proximity and outputs an OFF signal when a portion of the shaft of the induction motor 3 is not in proximity.

Figure 2:
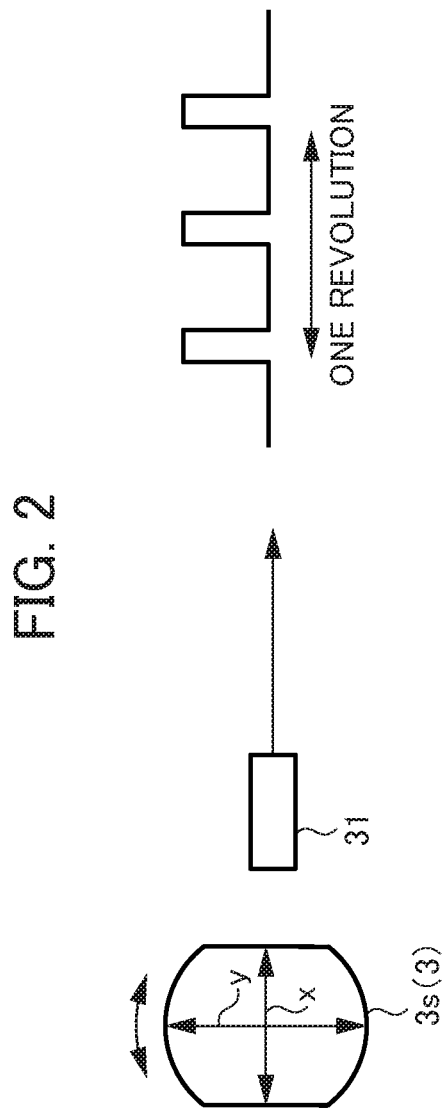
FIG. 2 is a diagram for describing an example of a proximity switch.

For example, as illustrated in FIG. 2, when two orthogonal diameters x and y of a shaft 3s of the induction motor 3 are different, the proximity switch 31 outputs an ON signal (a pulse signal of the HIGH level) when the longer diameter y portion is in proximity and outputs an OFF signal (a signal of the LOW level) when the longer diameter y portion is not in proximity. In the example of FIG. 2, since the longer diameter y portion is in proximity two times when the shaft 3s of the induction motor 3 rotates by one revolution, the proximity switch 31 outputs two pulse signals.

Figure 6:
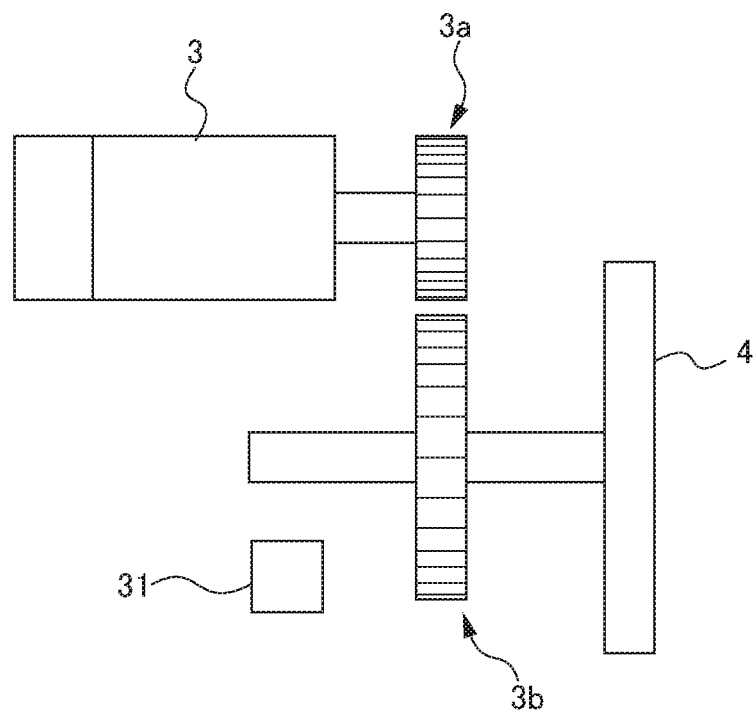
FIG. 6 is a diagram for describing an example of an arrangement of the proximity switch.

Although in the above discussion, the example where the proximity switch 31 is attached to the shaft of the induction motor 3 is described, a method of installing the proximity switch 31 is not limited to this method. For example, as shown in FIG. 6, the proximity switch 31 may be attached to a spindle 4 that is coupled to the shaft of the induction motor 3 through gears 3a, 3b, a timing belt or the like. In this case, it may be considered that in FIG. 2, the shaft 3s (rotating body) of the induction motor 3 is replaced with the spindle 4 (rotating body). In this way, the proximity switch 31 outputs the ON signal when a portion of the spindle 4 (rotating body) is in proximity and outputs the OFF signal when a portion of the spindle 4 is not in proximity.

The shape of the shaft of the induction motor 3 or the spindle 4 (rotating body) is not limited to this shape. As another example of the shape of the shaft of the induction motor 3 or the spindle 4 (rotating body), a sawtooth shape can be used.

The proximity switch 31 is different from a speed sensor such as a rotary encoder that is used in a speed control system of an induction motor. A difference between a proximity switch and a rotary encoder will be described below.

The rotary encoder outputs A-phase signals and B-phase signals. Hence, by using the rotary encoder, it is possible to detect a rotation position and a rotation direction in addition to a rotation speed. Furthermore, the rotation speed and the rotation position can be detected highly accurately and at high speed.

On the other hand, the proximity switch outputs one-phase pulses that are significantly lower in number than the output pulses of the rotary encoder, and typically outputs the one-phase pulse once or twice per revolution of the motor. Hence, by using the proximity switch, it is possible to detect a rotation speed, but it is not possible to detect a rotation position and a rotation direction.

Moreover, when the rotation speed is calculated from the pulse output of the proximity switch, the number of pulses is counted at a predetermined sampling period so as to be converted into a speed, and then the speed is averaged (smoothed), with the result that it takes a considerable amount of time to detect the rotation speed. Furthermore, the resolution of detection of the rotation speed that is determined by the sampling period and the averaging time is low. Since as described above, the rotation speed calculated from the output pulses of the proximity switch is low in responsiveness and resolution, a proximity switch cannot be used in the speed control system unlike a rotary encoder.

In the present embodiment, the rotation speed of the induction motor is detected in the following manner using a proximity switch rather than a speed sensor such as a rotary encoder.

The rotation speed calculating unit 32 calculates the rotation speed of the induction motor 3 on the basis of the ON signal and the OFF signal output from the proximity switch 31. For example, the rotation speed calculating unit 32 counts the number of pulses of the ON signals output from the proximity switch 31 at a predetermined sampling period, converts the counted number into a speed, averages (smooths) the converted speed using a filter, and thereby obtains the rotation speed of the induction motor 3.

When the proximity switch 31 outputs pulse signals n times when the shaft 3s of the induction motor 3 rotates by one revolution, the number of pulses generated in a sampling period. Fs is converted into a speed by the following formula.

$$\text{Speed (min}^{-1}) = 1/Fs \times 60/n$$

The speed command compensating unit 34 generates, on the basis of a rotation speed calculation value calculated by the rotation speed calculating unit 32, the speed command value (after compensation) obtained by compensating the speed command value from the numerical controller 2. Specifically, the speed command compensating unit 34 compensates the speed command value such that an error between the speed command value and the rotation speed calculation value becomes smaller. The speed command compensating unit 34 inputs, into the speed control system 10, the speed command value (after compensation) that is compensated.

Figure 3:
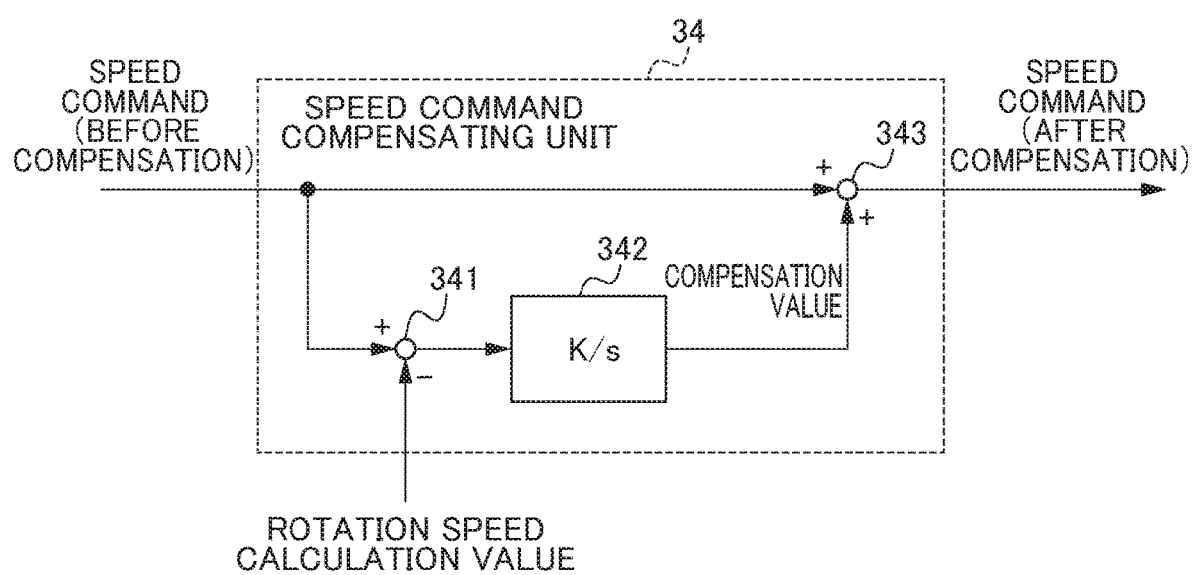
FIG. 3 is a diagram showing an example of a configuration of a speed command compensating unit in the motor controller shown in FIG. 1.

FIG. 3 is a diagram showing the configuration of the speed command compensating unit 34 in the present embodiment. The speed command compensating unit 34 shown in FIG. 3 includes a subtractor 341, a computing unit 342 and an adder 343. The subtractor 341 obtains a speed error between the speed command value (before compensation) from the numerical controller 2 and the rotation speed calculation value calculated by the rotation speed calculating unit 32. The computing unit 342 includes an integral term of a transfer function K/s (K is a compensation gain). The computing unit 342 performs I (integral) control on the speed error obtained by the subtractor 341 so as to compute a compensation value for the speed command value. The adder 343 adds the compensation value computed by the computing value unit 342 to the speed command value (before compensation) from the numerical controller 2 so as to obtain the speed command value (after compensation).

The subtractor 11, the speed controller 12, the current controller 14, the primary frequency control unit 16, the slip frequency calculating unit 18, the subtractor 20, the 2-phase-3-phase converting unit 22, the rotation speed estimating unit 30, the rotation speed calculating unit 32 and the speed command compensating unit 34 in the motor controller 1 described above are configured as a computation processor such as a digital signal processor (DSP) or a field-programmable gate array (FPGA), for example. The respective functions of the motor controller 1 are realized by executing predetermined software (a program, an application) stored in a storage unit, for example. The respective functions of the motor controller 1 may be realized by cooperation of hardware and software and may be realized by hardware (electronic circuits) only.

Next, an operation of the motor controller 1 of the present embodiment will be described.

First, with reference to FIG. 1, when the speed command value is supplied from the numerical controller 2, the subtractor 11 obtains the speed error between the speed command value (after compensation) that is obtained by the speed command compensating unit 34 compensating the speed command value supplied from the numerical controller 2 and the rotation speed estimation value estimated by the rotation speed estimating unit 30, and the speed controller 12 generates the current command value (torque command value) on the basis of the speed error. The current controller 14 generates, on the basis of this current command value and the actual current value (current FB value) of the induction motor 3 detected by the current detector (not shown), the d-phase voltage command value and the q-phase voltage command value. Here, the primary frequency control unit 16 generates the primary frequency command value on the basis of the current command value. The 2-phase-3-phase converting unit 22 converts, on the basis of the primary frequency command value generated by the primary frequency control unit 16, the d-phase voltage command value and the q-phase voltage command value generated by the current controller 14 into the voltage command value of the individual UVW phases, and supplies it to the induction motor 3.

Here, in the rotation speed estimating unit 30, the slip frequency calculating unit 18 calculates, on the basis of the d-phase current command value and the q-phase current command value, the optimum slip frequency in the slip-frequency-control type-vector control, to obtain the present slip frequency estimation value. For example, the slip frequency estimation value w is obtained by formula (1) described previously. The subtractor 20 obtains the rotation speed estimation value by formula (2) described previously on the basis of the primary frequency command value and the slip frequency estimation value.

Here, the actual speed may deviate greatly from the rotation speed estimation value. This is particularly likely to occur in a heavy load state, during rotation in a low speed range, during rapid change in load (during rapid transient change) or during rapid change in speed (during rapid transient change, for example, during acceleration and deceleration).

The motor controller that performs speed sensorless control performs control such that the rotation speed estimation value follows the speed command value. However, when the actual speed deviates from the rotation speed estimation value (in particular, in a heavy load state, during rotation in a low speed range, during rapid change in load or during rapid change in speed) though the rotation speed estimation value follows the speed command value, the actual speed deviates greatly from the speed command value. Hence, the deviation between the actual speed and the speed command value occurs.

Hence, in the present embodiment, when the actual speed deviates from the rotation speed estimation value, that is, when the actual speed deviates from the speed command value (in particular, in a heavy load state, during rotation in a low speed range, during rapid change in load or during rapid change in speed), the speed command value is compensated such that the actual speed approaches the speed command value.

Specifically, the rotation speed calculating unit 32 calculates and detects the rotation speed of the induction motor 3 on the basis of the ON signal and the OFF signal from the proximity switch 31. Then, the speed command compensating unit 34 compensates the speed command value such that the error between the speed command value and the rotation speed calculation value (actual speed) calculated by the rotation speed calculating unit 32 becomes smaller. More specifically, as shown in FIG. 3, the speed command compensating unit 34 adds, to the speed command value, a compensation value obtained by integrating the speed error between the speed command value and the rotation speed calculation value (actual speed) so as to compensate the speed command value. In this way, the smaller the rotation speed calculation value (actual speed), the more the speed command compensation unit 34 increases the speed command value. Consequently, the actual speed approaches the speed command value.

As described above, in the motor controller 1 of the present embodiment, the proximity switch 31 and the rotation speed calculating unit 32 detect the actual speed (rotation speed calculation value) of the induction motor 3, and the speed command compensating unit 34 compensates the speed command value such that the error between the speed command value and the detected actual speed (rotation speed calculation value) of the induction motor 3 becomes smaller, that is, such that the actual speed (rotation speed calculation value) of the induction motor 3 approaches the speed command value. In this way, even when the actual speed deviates greatly from the rotation speed estimation value (in particular, in a heavy load state, during rotation in a low speed range, during rapid change in load or during rapid change in speed), it is possible to enhance the degree to which the actual speed follows the speed command value.

Incidentally, as described previously, when the speed detection is performed with the proximity switch 31, the resolution of the proximity switch 31 is low, and thus it is necessary to apply a filter having a large time constant to the rotation speed calculating unit 32. When the speed detected by the proximity switch 31 is used as a feedback value for the speed control system 10, the motor controller 1 is likely to be unstable due to a delay in the filter. By contrast, as in the present embodiment, a method of using the speed detected by the proximity switch 31 so as to compensate the speed command value is used, and thus it is possible to obtain stability in the motor controller 1.

Figure 4:
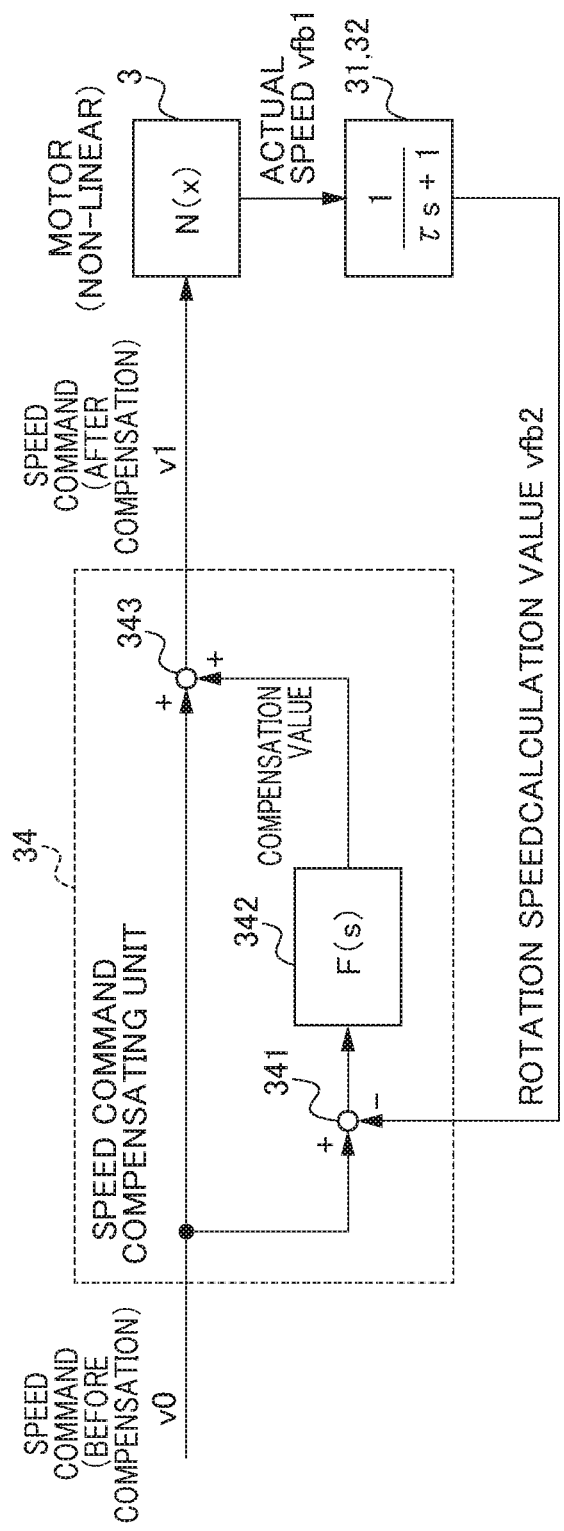
FIG. 4 is a diagram showing a simple equivalent model using a transfer function, which is an equivalent model of the motor controller shown in FIG. 1.

Here, consideration will be given to a configuration of the computing unit 342 in the speed command compensating unit 34. FIG. 4 is a diagram showing a simple equivalent model using a transfer function, which is an equivalent model of the motor controller shown in FIG. 1. In FIG. 4, the transfer function of the speed control system 10 is simply assumed to be 1, the motor 3 is represented by a transfer function $N(x)$ and the proximity switch 31 and the rotation speed calculating unit 32 are represented by the transfer function $1/(\tau s+1)$ of a primary filter. Moreover, the computing unit 342 in the speed command compensating unit 34 is represented by a transfer function $F(s)$. The speed command compensating unit 34 obtains, as a compensation value, a value in which a difference between a speed command value and a rotation speed calculation value (actual speed) is passed through the transfer function F(s), and adds the compensation value to the speed command value so as to generate a speed command value (after compensation).

The speed command compensating unit 34 realistically functions to make a rotation speed calculation value vfb2 after the proximity switch 31 and the rotation speed calculating unit 32 approach a speed command value (before compensation) v0. However, ideally, the actual speed vfb1 of the motor 3 before the proximity switch 31 and the rotation speed calculating unit 32 is desired to agree with the speed command value (before compensation) v0. The rotation speed calculation value vfb2 is changed to be a time constant (for example, 1 to 2 seconds) later than the actual speed vfb1 of the motor 3. Hence, it is considered that the transfer function F(s) of the computing unit 342 in the speed command compensating unit 34 includes a differential term for compensating for this delay.

With only the differential term, a steady-state error remains, and thus it is considered that the transfer function F(s) further includes an integral term. It is considered that the transfer function F(s) further includes a proportional term.

Figure 5:
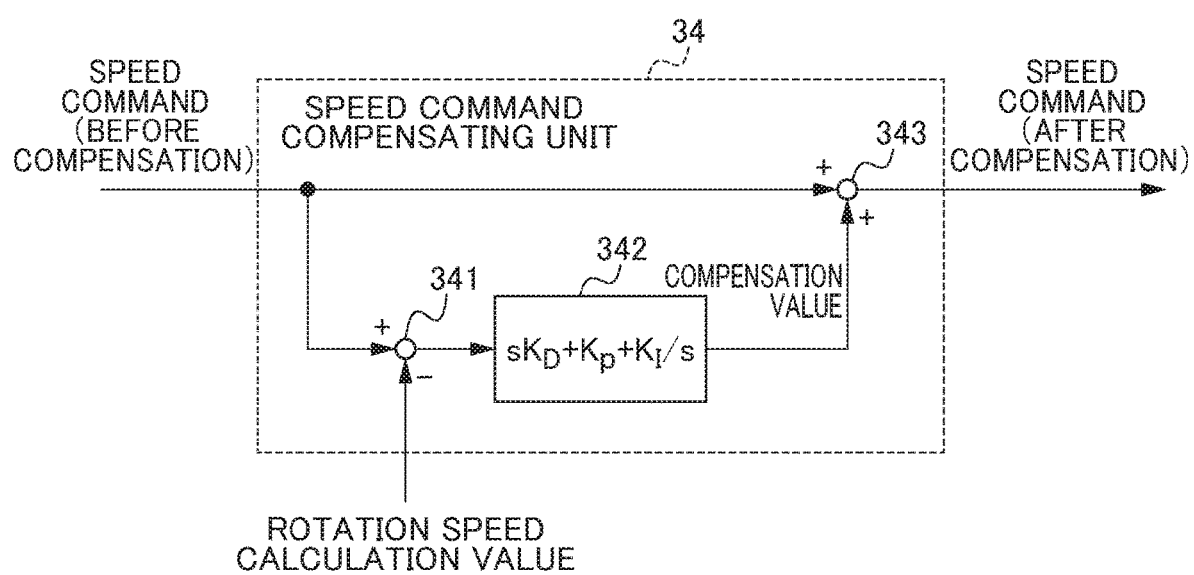
FIG. 5 is a diagram showing another example of the configuration of the speed command compensating unit in the motor controller shown in FIG. 1.

In other words, as shown in FIG. 5, the computing unit 342 may include the differential term of a transfer function $sK_D$ ($K_D$ is a differential gain), the integral term of a transfer function $K_1/s$ ($K_1$ is an integral gain) and the proportional term of a transfer function $K_P$ ($K_P$ is a proportional gain). In this way, the computing unit 342 may perform PID (proportional, integral, differential) control.

However, when the computing unit 342 in the speed command compensating unit 34 includes the differential term and the proportional term, it is expected that the speed command value (after compensation) v1 is unstable and that thus it is difficult to perform adjustment. In the present embodiment, the speed control is generally performed by use of the rotation speed estimation value estimated by the rotation speed estimating unit 30, and in terms of enhancing the degree to which the actual speed follows the speed command value when the actual speed deviates greatly from the rotation speed estimation value (in particular, in a heavy load state, during rotation in a low speed range, during rapid change in load or during rapid change in speed), the speed command compensating unit 34 does not need to respond at high speed. Hence, it is expected that in practical use, as shown in FIG. 3, the computing unit 342 in the speed command compensating unit 34 is preferably configured with only the integral term. In this way, it is possible to obtain stability in the motor controller 1 while the speed command value is being relatively slowly compensated by only the integral term.

Although the embodiment of the present invention is described above, the present invention is not limited to the embodiment described above, and various modifications and variations are possible. For example, although in the embodiment described above, the motor controller that controls the induction motor is illustrated, the feature of the present invention is not limited to this example, and the present invention can be applied to motor controllers that control various motors. For example, the feature of the present invention can also be applied to a motor controller that performs speed sensorless control on a so-called speed sensor less synchronous motor that does not include a speed sensor such as a resolver.

Since the deviation between the rotation speed estimation value and the actual speed in the speed sensorless control on the induction motor is greater than the deviation between the rotation speed estimation value and the actual speed in the speed sensorless control on the synchronous motor, the feature of the present invention is suitably applied to the motor controller that performs the speed sensorless control on the induction motor.

Moreover, although in the embodiment described above, the rotation speed calculating unit 32 averages, with the filter, the speed obtained by conversion from the number of pulses in the ON signals of the proximity switch 31 so as to obtain the rotation speed calculation value, there is no limitation to this configuration. For example, the rotation speed calculating unit 32 may simply average, for a predetermined time, the speed obtained by conversion from the number of pulses in the ON signals of the proximity switch 31 without use of the filter so as to obtain the rotation speed calculation value.

EXPLANATION OF REFERENCE NUMERALS

1: Motor controller
2: Numerical controller (CNC)
3: Induction motor (motor)
3s: Shaft (rotating body)
10: Speed control system
11, 20: Subtractor
12: Speed controller
14: Current controller
16: Primary frequency control unit
18: Slip frequency calculating unit
22: 2-phase-3-phase converting unit
30: Rotation speed estimating unit
31: Proximity switch
32: Rotation speed calculating unit
34: Speed command compensating unit
341: Subtractor
342: Computing unit
343: Adder

What is claimed is:

1. A motor controller that performs speed sensorless control on a motor, the motor controller comprising:
   a rotation speed estimating unit that estimates a rotation speed of the motor on the basis of current information and primary frequency information of the motor;
   a speed control system that performs speed control on the motor on the basis of a rotation speed estimation value estimated by the rotation speed estimating unit;
   a proximity switch that outputs an ON signal when a portion of a rotating body of the motor is in proximity and outputs an OFF signal when a portion of the rotating body of the motor is not in proximity;
   a rotation speed calculating unit that calculates a rotation speed of the motor on the basis of the ON signal and the OFF signal output from the proximity switch; and
   a speed command compensating unit that compensates a speed command value such that an error between the speed command value and a rotation speed calculation value calculated by the rotation speed calculating unit becomes smaller, the speed command compensating unit comprising:
   a subtractor that obtains the error between the speed command value and the rotation speed calculation value calculated by the rotation speed calculating unit;
   a computing unit that computes a compensation value for the speed command value on the basis of the error obtained by the subtractor; and
   an adder that adds the compensation value computed by the computing unit to the speed command value so as to obtain a speed command value that is compensated, wherein the speed control system performs the speed control on the motor on the basis of the speed command value that is compensated by the speed command compensating unit and the rotation speed estimation value.

2. The motor controller according to claim 1, wherein the computing unit is formed with an integral term.

3. The motor controller according to claim 1, wherein the proximity switch outputs the OFF signal when no portion of the rotating body of the motor is in proximity.

4. The motor controller according to claim 3, wherein the speed command compensating unit compensates the speed command value based on an integral gain of the error.

5. The motor controller according to claim 4, wherein the speed command compensating unit excludes one or both of a differential gain of the error or a proportional gain of the error from the compensating of the speed command value.

6. The motor controller according to claim 1, wherein the motor controller includes a processor configured to function as the rotation speed estimating unit, the speed control system, the rotation speed calculating unit, and the speed command compensating unit.

* * * * *